(12) United States Patent
Klammer et al.

(10) Patent No.: US 7,007,559 B2
(45) Date of Patent: Mar. 7, 2006

(54) METHOD AND DEVICE FOR SETTING THE PRE-TENSION OF BLADES OF A GRANULATING DEVICE

(75) Inventors: Günther Klammer, Aschbach (AT); Norbert Reitinger, Linz (AT)

(73) Assignee: EREMA Engineering Recycling Gesellschaft m.b.H., Ansfelden (AT)

( * ) Notice: Subject to any disclaimer, the term of this patent is extended or adjusted under 35 U.S.C. 154(b) by 242 days.

(21) Appl. No.: 10/468,952

(22) PCT Filed: Jun. 6, 2002

(86) PCT No.: PCT/AT02/00170

§ 371 (c)(1),
(2), (4) Date: Aug. 22, 2003

(87) PCT Pub. No.: WO02/100621

PCT Pub. Date: Dec. 19, 2002

(65) Prior Publication Data

US 2004/0080066 A1    Apr. 29, 2004

(30) Foreign Application Priority Data

Jun. 8, 2001    (AT)    ............................... A 894/2001

(51) Int. Cl.
*G01L 3/00*    (2006.01)
(52) U.S. Cl. ................... 73/862.08; 264/40.1; 425/311
(58) Field of Classification Search ............. 73/862.08; 264/40.1; 425/311
See application file for complete search history.

(56) References Cited

U.S. PATENT DOCUMENTS 4,285,652 A * 8/1981 Anders ........................ 264/142
4,591,436 A * 5/1986 Hofstede ..................... 210/264

(Continued)

FOREIGN PATENT DOCUMENTS

DE    1959507 A    6/1971

(Continued)

*Primary Examiner*—Max Noori
*Assistant Examiner*—Alandra Ellington
(74) *Attorney, Agent, or Firm*—Townsend and Townsend and Crew LLP (57) ABSTRACT

A method of setting pre-stressing, by which blades (11) of a granulating head carried by a shaft (12) which is driven by a motor (21) and which is displaceable in the axial direction of a granulating device abut against the perforated plate (8), makes use of the torque of the motor (21) for the said setting. To this end, the shaft (12) is adjusted at a constant speed in both axial directions in succession, the pattern of the torque M of the motor (21) being recorded over the displacement path x of the shaft (12) for both directions. The differential $dM/dx$ is formed from this and the position $x_0$ of the shaft is then determined for $dM/dx = 0$. Starting from the said position $x_0$ a position $x = x_0 + x_z$ of the shaft (12) is set, in which $x_z$ represents the desired advance of the shaft (12) in the direction towards the perforated plate (8). The device for carrying out this method provides for a sensing device (66) for the time pattern of the torque M of the motor (21). The output signal of the said sensing device (66) influences an actuating drive (75) for the displacement of the shaft (12). In addition, a device (69) for forming the differential $dM/dx$ is provided, as well as a device (70) for determining the position $x_0$ of the shaft (12) for $dM/dx = 0$. The said two devices are connected to the actuating drive (75).

10 Claims, 3 Drawing Sheets

U.S. PATENT DOCUMENTS 4,614,307 A * 9/1986 Lauser .................... 241/101.4
5,017,119 A 5/1991 Tokoi
5,223,279 A * 6/1993 Lambertus .................. 264/142
5,378,135 A * 1/1995 Flottmann et al. .......... 425/168
5,587,186 A 12/1996 Voigt
6,174,475 B1 * 1/2001 Kasai et al. ................ 264/142

FOREIGN PATENT DOCUMENTS

DE 2444839 A 7/1975
EP 0418941 A 3/1991

* cited by examiner

METHOD AND DEVICE FOR SETTING THE PRE-TENSION OF BLADES OF A GRANULATING DEVICE

The invention relates to a method of setting a pre-stressing, by which blades of a granulating head—carried by a shaft which is driven by a motor and which is displaceable in the axial direction—of a granulating device abut against the perforated plate, through the perforations of which the material to be granulated, in particular thermoplastic material, is supplied, in which use is made of the torque of the motor for this setting. In addition, the invention relates to a device for performing a method of this type.

A method of the type outlined in the introduction is known from EP 418 941 A2 for an underwater granulating device, in which the power consumption of the drive motor of the granulating shaft is utilized to set the magnitude of the hydrodynamic force which occurs during the rotation of the blades.

It is known that in the case of granulating devices strands of a melt or plasticized compound issue from the perforations of the perforated plate and are struck off by rotating granulating blades to form a particle shape. Depending upon the type of the granulating device, the cut strands (granulates) are then either cooled in a direct manner (underwater granulation) or flung into a cooling medium by the centrifugal force which occurs during the striking-off procedure. The said cooling medium can be air (air granulation) or water (water-ring granulation). For the granulation of low-viscosity compounds, the blades have to abut against the perforated plate without a gap in a reliable manner, for which purpose it is necessary for the blades to be pressed against the perforated plate. In this case it is known to effect this pressing by means of springs or by means of an hydraulic or pneumatic device or to advance the granulating shaft towards the perforated plate in such a way that the blades abut against the perforated plate with a pre-stressing achieved by bending. The known designs, however, have drawbacks in each case. Springs are susceptible to fatigue and to fracture, and hydraulic or pneumatic systems require a substantial outlay. Pressing the blades whilst bending them is unreliable, since the blades are continuously worn during operation and the contact pressure is altered as a result.

The object of the invention is to improve a method of the type outlined in the introduction in such a way that a reliable and as uniform as possible a pressing of the blades against the perforated plate of the granulating device is achieved, in which case figures of the wear of the blades, of the wear of the perforated plate and of the energy consumption of the motor which are as advantageous as possible are to be sought. This object is attained according to the invention in that the shaft is adjusted at a constant speed in both axial directions in succession, the pattern of the torque of the motor being recorded over the displacement path for both directions and the differential $$\frac{dM}{dx}$$

being formed from this, in which x represents the displacement path of the shaft, in that the position $x_0$ of the shaft is then determined for $$\frac{dM}{dx} = 0,$$

and in that, finally, starting from the said position $x_0$ a position $x=x_0+x_z$ of the shaft is set, in which $x_z$ represents the desired advance of the shaft in the direction towards the perforated plate. In this case the invention is based upon the knowledge, ascertained from tests, that with a constant throughput of the granulating device and with a constant rotational speed of the granulating shaft the torque of the drive motor of the granulating shaft is at a minimum at a specific advance position of the said granulating shaft and increases when moved in both directions from the said minimum position. As a rule, this minimum position $x_0$ is that position in which the granulating blades just touch the perforated plate but abut against it without pressure. In practice, however, this position, in which the wear of the granulating blades and of the perforated plate is theoretically at a minimum cannot be maintained, since slight pressing forces of the granulating blades are necessary on account of manufacturing tolerances and as a result of the pressure of the strands of the melt issuing from the perforated plate. This specific pre-stressing of the granulating blades is dependent upon the material being processed, which is plastics material as a rule, but which can also be formed by another pasty substance, for example a foodstuffs substance such as pastry goods or muesli etc. In addition, the said specific pre-stressing is dependent upon the processing conditions. It must therefore be adapted to the particular situation existing in each case. If this takes place in the manner according to the invention, then a reliable pressing of the blades against the perforated plate and thus a satisfactory granulate quality and also a low energy consumption and a low degree of wear of the blades and of the perforated plate are achieved, since the service life of the granulating blades can be prolonged by a suitable free choice of the pre-stressing dependent upon the method. It is likewise possible to control the pre-stressing by way of current process parameters and to alter them during operation. Examples of such variable process parameters are the throughput and the types of the material being processed, in particular plastics material. In the same way, the wear of the granulating blades can be compensated by means of continuous adjustment with this method.

In accordance with a further development of the method according to the invention the displacement of the shaft is carried out in both axial directions between two positions $x_1$, $x_2$ which correspond to two pre-set limit values $\delta$, $\epsilon$ for $$\frac{dM}{dx}$$

for which $\delta<0$ and $\epsilon>0$ applies. This ensures a reliability of the process since the two limits $\delta$, $\epsilon$ selected in this way ensure that there will definitely be a point between the two positions $x_1$, $x_2$ to which $$\frac{dM}{dx} = 0$$

applies.

In the method according to the invention the procedure is advantageously such that the torque pattern of the motor is filtered by a low-pass filter before the differential $$\frac{dM}{dx}$$

is formed. The said low-pass filter flattens out the output signal of the device which senses the torque of the motor and converts it into an electrical output signal.

In order to be able to adapt to changes in the circumstances existing during the granulation procedure, in accordance with a preferred embodiment of the method according to the invention the procedure is such that the measurements are repeated at intervals and the setting of the pre-stressing is altered accordingly.

The device according to the invention for carrying out the method according to the invention is based upon a design with a perforated plate, for example of an extruder, against the perforations of which at least one blade carried by a granulating head of a granulating device is pressed with pre-stressing, the said granulating head being supported inside a granulation housing by a shaft which is displaceable in the granulation housing in the axial direction and which is driven by a motor in rotational movement about its axis, a sensing device—the output signal of which influences an actuating drive for the displacement of the shaft—being provided for the time pattern of the torque of the motor. On the basis of a design of this type, the device according to the invention is characterized in that a device for forming the differential $$\frac{dM}{dx}$$

and a device for determining the position of the shaft for $$\frac{dM}{dx}=0$$

are connected to the actuating drive. In this way, the actuating drive is controlled in the sense of the method according to the invention.

In this case, a device, in particular a low-pass filter, which flattens out the output signal of the sensing device for the time pattern of the torque of the motor, is connected to the said sensing device, in order to prevent falsifications of the measurement result by peaks occurring in the output signal of the said sensing device.

In order to observe the most advantageous method conditions over a prolonged operating duration, in accordance with a preferred embodiment of the invention an input unit is provided for repeating the measurements at pre-determined time intervals. This input unit can be actuated manually or automatically, and advantageously at freely selectable time intervals.

The invention is illustrated diagrammatically and explained in greater detail with reference to embodiments in the drawing, in which.

In the case of the method according to the invention the power consumption of the motor 21 (FIGS. 3, 4) of the granulating device is determined and evaluated. The following applies in this case:

$P=f(M)$ for constant n>0.

In this P represents the power consumption of the motor and M the torque of the latter. This is formed by the following components:

$M=M_{idling}+M_{friction}+M_{gap}+M_{plastics\ material}+M_{section}$

In this $M_{section}$ is the reaction moment on the basis of the section through the strand of the melt, $M_{idling}$ is the reaction moment on the basis of the mechanical design (including bearing friction and aerodynamic forces), $M_{friction}$ is the reaction moment on the basis of the friction of the granulating blades on the perforated plate, $M_{gap}$ is the reaction moment as a result of increased perceptible friction on the basis of the cutting gap and the thickening of the film of the melt, and $M_{plastics\ material}$ is the reaction moment on the basis of the issuing melt of the plastics material (including acceleration forces and cutting forces, i.e. essentially specific characteristic data of the plastics material and variables specific to the yield).

If different operating states are first considered, then there results:

A) An operating state with a constant throughput at a constant rotational speed of the granulating shaft for x>0 (x . . . displacement path of the granulating shaft). This operating state is illustrated diagrammatically in the view c) in FIG. 1 below for a blade 11 abutting against the perforated plate 8 (for abutment of the blade 11 against the perforated plate 8 without pressure x=0, this operating state being shown in the view b) in FIG. 1).

In this operating state similar conditions apply as in a dry operation (without melt). The friction is increased as a result of increasing the pressing force. On the basis of the above remarks the following can be agreed for a granulating blade, if the tangential frictional force as a result of the pressing is designated R, the coefficient of friction is designated $\mu$, the length of the blade head arms is designated r and the pressing force of the granulating blades is designated N:

If $R=\mu \cdot N$ then there results $R=f(x)$ for x>0.

If $M_{friction}=R \cdot r$ and r=constant there results $M_{friction}=f(x)$ for $x \geq 0$ and $M_{friction}>0$ for x>0

$M_{friction}=0$ for $x \leq 0$.

B) An operating state with a constant throughput at a constant rotational speed of the granulating shaft for x<0.

Figure 1:
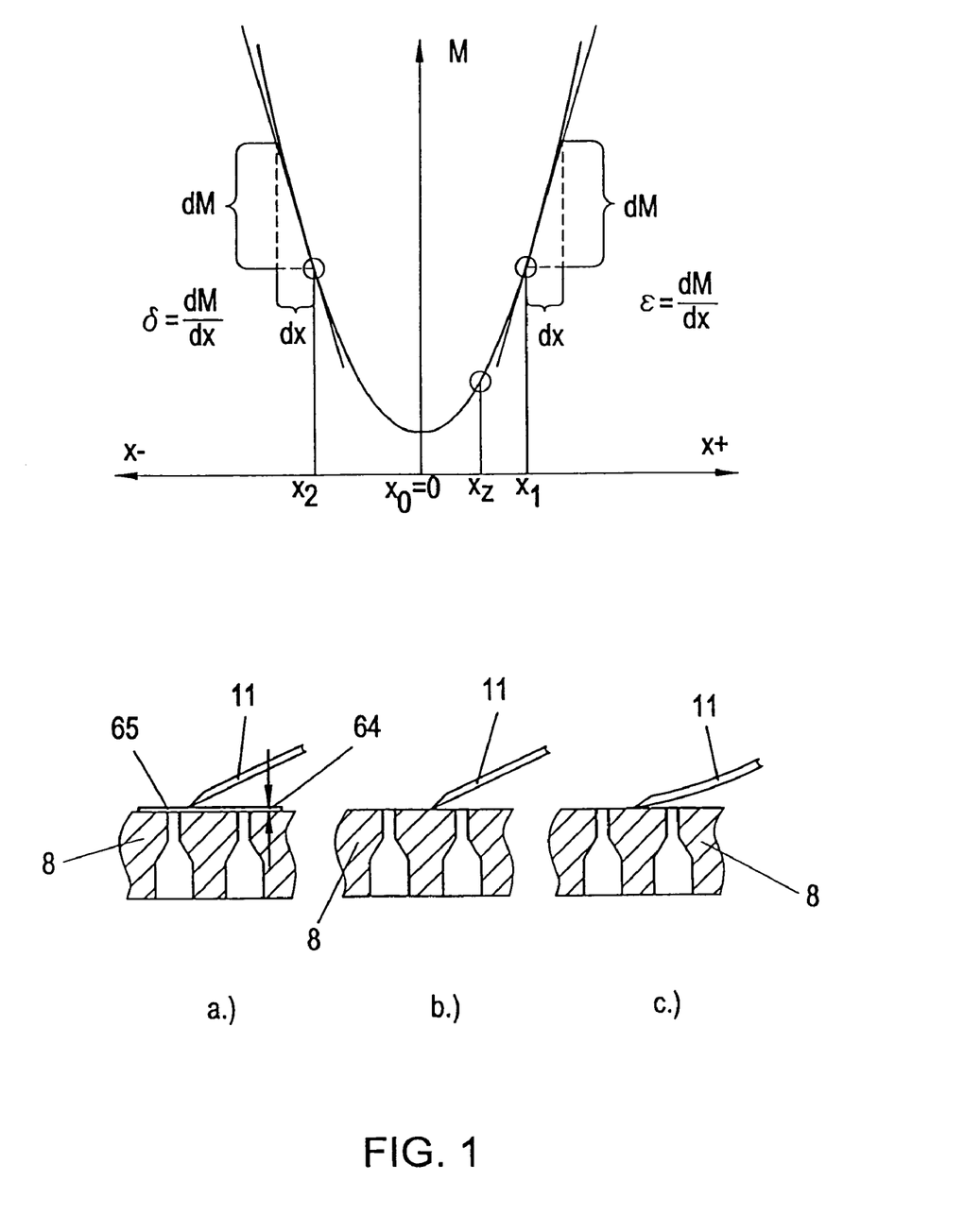
FIG. 1 shows an idealized pattern—determined by computer—of the torque of the drive motor of the granulating shaft in a manner dependent upon the displacement position of the granulating shaft.

The view a) in FIG. 1 corresponds to this operating state.

As has been established in tests, the torque increases as a result of an increase in the gap 64 between the granulating blade 11 and the perforated plate 8. As a result of a larger cutting gap higher forces are necessary in order to cut the strand of the melt. An increased deposit of the melt 65 on the operating face of the granulating perforated plate additionally increases the coefficient of friction between the granulating blade and the perforated plate.

The dependency of the force F upon increased, perceptible friction on account of the cutting gap and the thickening of the film of the melt on the granulating perforated plate can in turn be restricted as follows for a granulating blade:

For $x=0$ there follows $F=0$
For $x>0$ there follows $F=0$
For $x<0$ there follows $F>0$
With $M_{gap}=F\cdot r$ there results in an analogous manner to A):
$M_{gap}=f(x)$ for $x\leq 0$ and
$M_{gap}>0$ for $x<0$
$M_{gap}=0$ for $x\geq 0$.

If the above is assumed, there results for an operating state with a constant throughput at a constant rotational speed of the granulating shaft:

If the difference $\Delta M$ of two adjacent operating states $x_1$, $x_2$ is formed, there follows:

$$\Delta M = M_{x2} - M_{x1}$$

For n=constant and a constant throughput and the nature of the melt remaining the same there results:

$$\Delta M = M_{gap, x2} - M_{gap, x1} + M_{friction, x2} - M_{friction, x1}$$

From this, taking the above relationships into consideration, there results:

$\Delta M=f(x)$ for all [values of] x in the range $x_1$, $x_2$ with $x_1>0$ and $x_2<0$, where the following applies:
$\Delta M=0$ for $x=0$ in the range $x_1$, $x_2$
$\Delta M=\Delta M_{friction}>0$ for $x>0$ in the range $0$, $x_1$
$\Delta M=\Delta M_{gap}>0$ for $x<0$ in the range $0$, $x_2$ Tests have now shown that the graph of the torque M over the path x has the shape illustrated in FIG. 1, and which has similarities to a parabola. At $x_0=0$ this graph is at a local minimum. This minimum can be determined by measurement, namely for each type of material to be granulated, each mass throughput and each granulating rotational speed, provided only that the rotational speed m can be considered to be constant for each operating state for a short time and that the throughput and the nature of the melt can likewise be considered to be constant. Since measurements and their evaluation can be carried out within seconds with available sensing and measurement appliances and recent logic circuitry, the assumptions mentioned above can be considered to be given.

If the knowledge that, although the wear of the granulating blades and of the perforated plate is theoretically at a minimum for $x_0=0$, a small pressing force of the granulating blades is necessary in practice in order to ensure a trouble-free granulation, is taken as a starting point, then, starting from the position $x_0=0$, it is possible to set a specific pre-stressing of the granulating blades. If the path of advance of the granulating blades required for this is designated $x_z$, then an operating point $x_z$ is produced (FIG. 1). The value of $x_z$ and the magnitude of the pre-stressing achieved thereby result from the spring characteristic of the granulating blades 11 and can be adapted without difficulty to current process parameters, such as throughput and the types of the plastics material being processed. This adaptation can also be controlled automatically in a continuous manner, so that a continuous adaptation to different operating conditions takes place. As a result, the service life of the granulating blades 11 is considerably prolonged.

Figure 2:
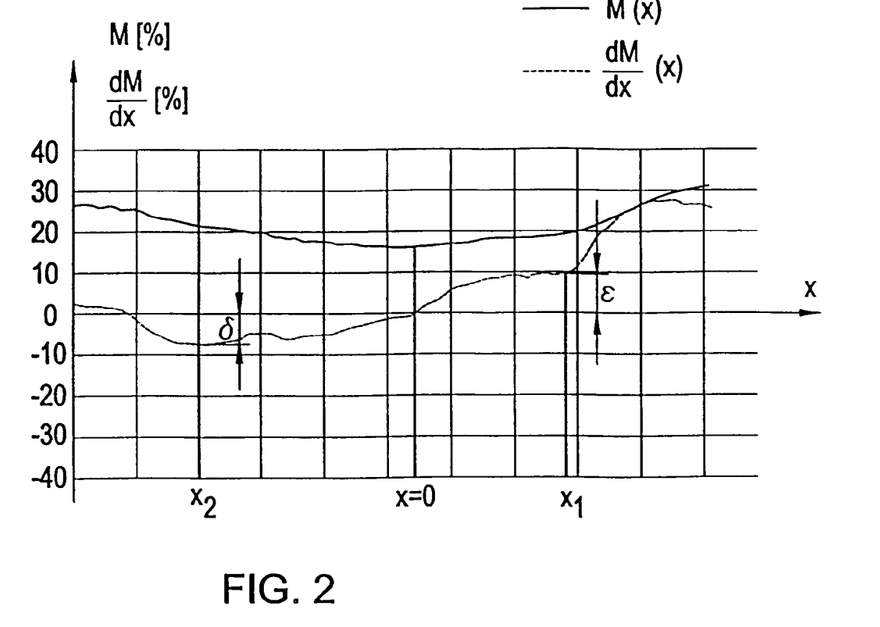
FIG. 2 shows the torque pattern determined by measurement and the differentiated graph thereof over the displacement path.

In practice the torque which is exerted by the drive motor 21 in order to rotate the blade shaft 12 (FIG. 4) is measured continuously. This is carried out by means of a sensing device 66 (FIG. 3) of any desired type. The time actuation of the discrete actuation times t can be carried out in any desired manner manually, or automatically by a measuring-time pick-up 67, and in each case immediately after the start of the granulation. The output signal of the sensing device 66 arrives at a low-pass filter 68 which causes a flattening-out of the signal delivered by the sensing device 66. A flattened-out curve, such as shown in FIG. 1, is then formed from the somewhat irregular measurement result for M, which is illustrated in FIG. 2 and which is obtained during the advance of the blade shaft 12. The output signal of the filter 68 arrives at a differentiating member 69, by which the signal $$\frac{dM}{dx}(x)$$

is formed from the signal for M(x) (FIG. 2). A logic circuit 70 of any desired suitable design connected to the differentiating member 69 determines the minimum $x_0=0$ from this. Since the rate of advance of the blade shaft 12 is constant, $$\frac{dM}{dx}$$

proportional to $$\frac{dM}{dt}$$

applies with an adequate degree of accuracy. In order to ensure that there is a definitely point for which $$\frac{dM}{dx}=0$$

applies above the measurement path, two limits $\epsilon$, $\delta$ are entered into the logic circuit 70 by way of an input unit 72 in such a way that $$\frac{dM}{dx}=\varepsilon$$

applies at the point $x_1$ for $x_1>0$ and $$\frac{dM}{dx}=\delta$$

at the point $x_2$ for $x_2<0$.

The position $x_0=0$ ascertained in this way is subsequently used as a reference value. Then, by the advance of the blade shaft 12, the position $x=x_0+x_z$ is reached, in which $x_z>0$ defines the process safety which is necessary in order to compensate tolerances, in such a way as to ensure an adequate, but the minimum necessary, blade-pressing force.

In this way, $x_z$ is a parameter which is dependent upon the method conditions and which can also be altered during the operation, in particular in order to adjust to varying method conditions. The parameter $x_z$ can be fed in by an input unit 73 connected to the logic circuit 70 or can be read out of a process data-base. The said input unit 73 can also be used to determine the intervals of the setting procedure, so that when the circuit is laid out in this way it is possible to dispense with the measuring-time pick-up 67 for setting intervals.

In addition, the parameter $x_z$ is dependent upon the spring characteristic of the granulating blades and, in the case of rigid blades, the elasticity of the stressing is an essential variable for the choice of $x_z$.

As already mentioned, the procedure described allows a self-adjustment for the purpose of compensating the wear of the granulating blades. To this end it is merely necessary for the input unit 73 to initiate the times t of the setting procedure in freely selectable time intervals $\Delta t$. An alternative to this is to control the measurement-time intervals $\Delta t$ likewise as a function of the process. Finally, the initiation of the adjustment of the granulating blades can also be carried out manually.

Figure 3:
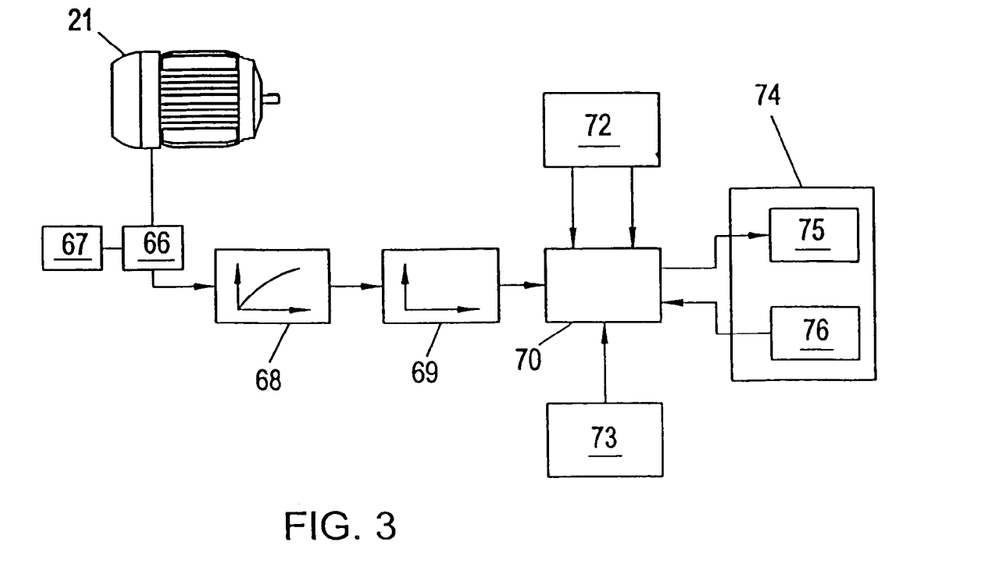
FIG. 3 is a block diagram of the control unit for the axial adjustment of the shaft of the granulating blades.

A positioning drive 74, which has an actuating drive 75 and a position pick-up 76, is used for the described advance and return movement of the blade shaft 12 as well as for determining their respective position. The actuating drive provides a forward and reverse movement of the blade shaft 12 at a constant speed. Any drive of known design can be used to this end, for example hydraulic cylinders, pneumatic cylinders, linear drives, three-phase drives, spindle drives or stepping motors. The position pick-up 76 detects the respective position of the blade shaft 12 and thus also the reference value $x_0$, [and] it has to have a sufficiently accurate degree of reproducibility. In the case of actuating drives which are controlled by pulses, it is possible to dispense with the position pick-up, since the pulses can be counted and evaluated with an adequate degree of accuracy by the reference point $x_0$.

The actuating drive 75 is controlled by the figures ascertained by the logic circuit 70, so that the movement of the blade shaft 12 desired in each case is achieved. This setting is determined in each case by the position pick-up 76 and is reported to the logic circuit 70.

Figure 4:
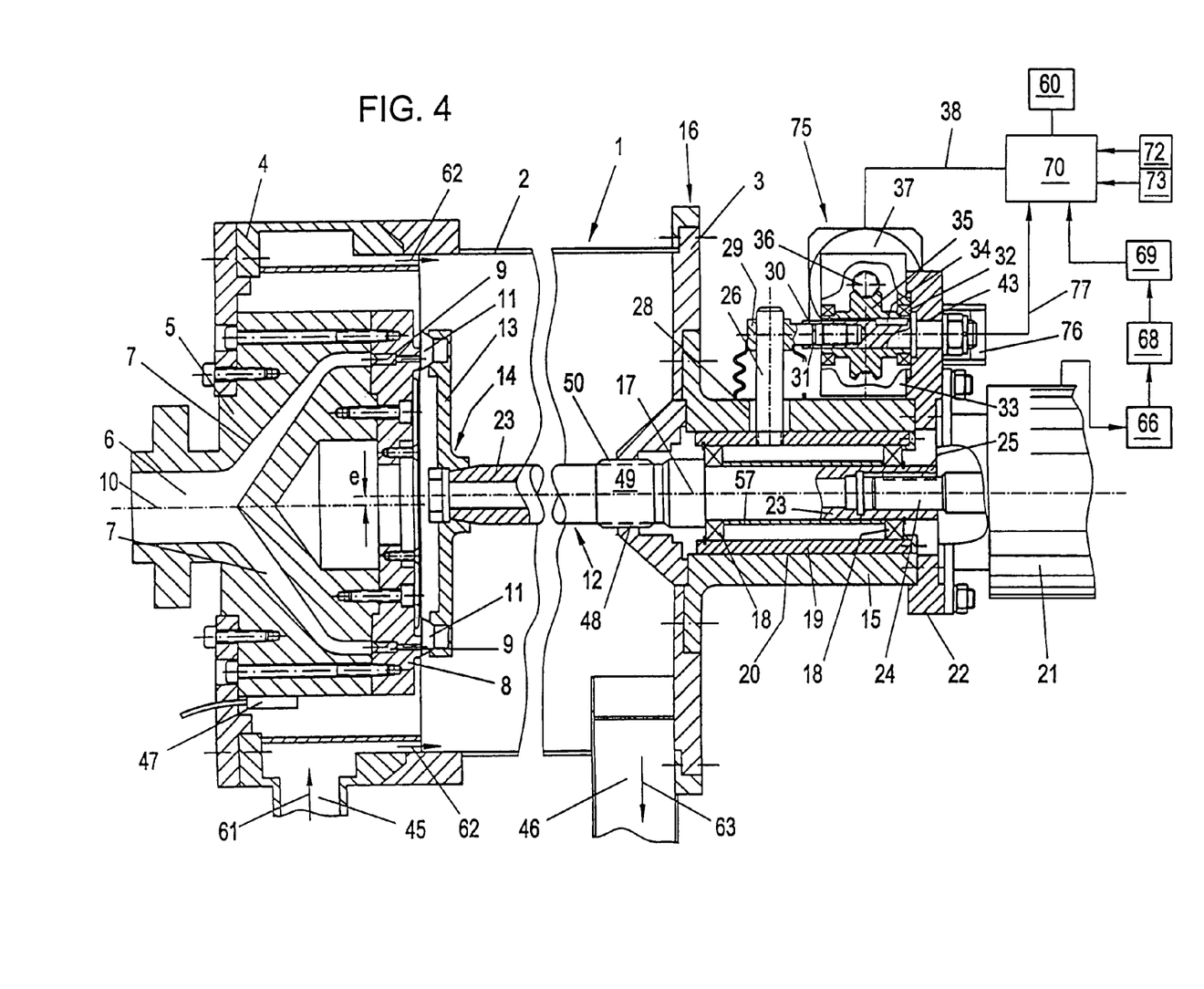
FIG. 4 is a longitudinal section through a granulating device.

A device suitable for performing the method according to the invention is illustrated in FIG. 4. This granulating device has, in a known manner, a stand 16 which supports a granulation housing 1 which has a cylindrical generated surface 2 which is terminated at one of its end faces by an end wall 3 and at its other end face by the feed member 5 connected to the nozzle connexion 4. The feed member 5 has a feed duct 6 for the material to be granulated, to which [feed duct 6] are connected branch lines 7 which lead to the nozzles 9 of the nozzle connexion 4, which are arranged distributed in a circle about the axis 10 of the feed member 5 in a perforated plate 8. The strands issuing from the nozzles 9 are knocked off by blades 11 which are arranged on radial arms 13 of the blade head 4 of the blade shaft 12. The shaft 12 is mounted in a rotatable manner in a bearing housing constructed in the form of a socket 15 of the stand 16. In addition, the blade shaft 12 is longitudinally displaceable in the direction of its axis 17 with respect to the frame 16 by means of the actuating drive 75, in order to be able to press the blades 11 against the perforated plate 8 at the desired pressure in each case. To this end the shaft 12 is mounted in a rotatable manner by means of roller bearings 18 in a sleeve 19 which is displaceable in its longitudinal direction in a cylindrical bore 20 in the socket 15. The shaft 12 is rotated about its axis 17 by a motor 21, the rotational speed of which can advantageously be varied, for example a three-phase motor which is bolted onto a flange 22 connected to the socket 15. In order to prevent the motor 21 from having to take part in the longitudinal displacement of the shaft 12, the shaft 12 is subdivided into two portions 23, 24 which are connected to each other in a rotationally fixed manner by means of a wedge 25 in such a way that the portion 23 can move relative to the portion 24 in the axial direction of the shaft 12, but the portion 24 always retains its axial position.

The two bearings 18 of the blade shaft 12 are kept at a distance from each other by means of spring rings and by a spacer sleeve 57.

The sleeve 19 supports an entrainment means 26 in the form of a radial pin which is screwed into the sleeve 19 and which passes through and is guided in a slot 28 in the socket 15 extending in the axial direction of the shaft 12. The slot 28 is so long that the pin 26 can move in it for the respective displacement paths of the shaft portion 23. The free end of the said entrainment means 26 is situated in an opening in the head 29 of a threaded spindle 30 which extends in the axial direction of the shaft 12 and which is screwed into a threaded sleeve 31. The said threaded sleeve 31 is mounted in a rotatable manner in a housing 33 which is screwed onto the flange 22. The generated surface of the threaded sleeve 31 carries a wedge 34 which engages in a longitudinal groove in the central opening of the wheel 35 of a worm gear, so that the worm wheel 35 is connected to the threaded sleeve 31 in a rotationally fixed manner. The worm wheel 35, which is mounted by means of bearings 32 in the housing 33 in a rotatable manner and which is prevented from being displaced axially by the bearings 32, meshes with a worm 36 which is connected in a rotationally fixed manner to the drive shaft of a servo motor 37 of the actuating drive 75 which is secured to the housing 33. The servo motor 37 is fed by the logic circuit 70 by way of a line 38 for the automatic adjustment of the blade head 14. As illustrated in FIG. 3, the logic circuit 70 continuously receives the torque figures detected at the motor 21 in a filtered and differentiated form by way of the components 66, 68, 69. The torque of the motor 21 and the analogue ampere figure respectively depend upon the pressure at which the blades 11 slide over the end face of the perforated plate 8.

If the logic circuit 70 establishes that a displacement of the blade shaft is necessary in order to alter the contact pressure of the blades 11, then the actuating drive 75 is supplied by way of the line 38 in such a way that the sleeve 19 is displaced in the direction towards the perforated plate 8 by way of the gearing formed by the components 26 to 36, so that the blades 11 are pressed against the perforated plate 8 in a different manner than before. In this case the sleeve 19 entrains the shaft portion 23 in the axial direction by way of the roller bearings 18. The wedge connexion 25 ensures that the shaft portion 24 does not take part in the said axial movement. When the torque to be applied by the motor 21 or its current consumption respectively has reached the desired figure again, the actuating motor 37 is stopped again.

The position pick-up 76 can be designed in any desired manner. The procedure described, however, indicates in a simple manner the possibility of designing the position pick-up 76 in the form of an angle pick-up which is connected to the threaded sleeve 31 in a rotationally fixed manner and which uses the relative rotation of the latter with reference to the stationary stand 16 or its flange 22 for indicating the position. Its signal is fed to the logic circuit 70 by way of the line 77.

The transmission of the rotational speed of the drive shaft of the servo motor 37 by way of a worm gear and the thread connexion between the threaded spindle 30 and the threaded sleeve 31 provide the possibility of a very fine adjustment for the blades 11 and thus a fine control of the contact pressure, as well as the possibility of using commercially available components. In addition, the coupling between the worm wheel 35 and the worm 36 acts in a self-locking manner, in such a way that the sleeve 19 and thus the shaft portion 23 supporting the blades cannot move inadvertently in the axial direction. In order to achieve wear of the blades 11 which is as uniform as possible over the entire length of the cutting edges of the latter, the arrangement can be made that the axis 17 of the blade shaft 12 is situated so eccentrically by a degree of eccentricity e with respect to the axis 10 of the perforated plate 8 or to the centre of the circle on which the nozzles 9 are arranged, that the entire cutting length of the blades 11 is utilized. As a result, a longer service life of the blades 11 is made possible.

An extension of the threaded sleeve 31 passes through an opening 43 in the flange 22 and is provided on the outside with a thread on which a nut 44 is screwed and is secured by means of a cotter pin 52. In addition, the threaded sleeve 31 is provided with a collar 53 which together with the nut 44 secures the axial position of the threaded sleeve 31 with respect to the flange 22. It is nevertheless possible, if desired, to pre-set the axial position of the threaded sleeve 31 and thus of the blade shaft 12 if the entrainment means 26 is unscrewed from the sleeve 19 and withdrawn from the opening 27. The threaded spindle 30 can then be rotated in the threaded sleeve 31, and this results in a change in the axial position of the opening 27 and thus of the blade shaft 12 when the entrainment means 26 is inserted in the opening 27 again.

The logic circuit 60 [sic—recte 70] can have connected to it a display or signal device 60, which indicates visually and/or acoustically that an automatic adjustment is in progress and cuts off its signal as soon as the adjustment has the effect desired, i.e. the desired pressing interval of the blades 11 against the perforated plate or the magnitude—corresponding to the said interval—of the monitored operating size of the motor 21 has been achieved again.

A coolant supply line 45, preferably for water, opens into the granulation housing 1 in a known manner, the coolant flowing in the direction of the arrow 61 and being sprayed into the region of the nozzles 9 by branch lines (not shown) in the direction of the arrows 62. As a result, the lenticular or cylindrical granulate particles knocked off by the blades 11 are cooled immediately after issuing from the nozzles 9 and, together with the coolant, they are removed from the granulation housing 1 by way of an outlet 46 in the direction of the arrow 63. The temperature in the feed member 5 can be monitored by a sensor 47. In order to prevent coolant from penetrating into the region of the mounting of the blade shaft 12 through the opening 48 in the end wall 3 through which the blade shaft 12 passes, the portion 49 situated in the said opening 48 is provided with a returning thread 50 which has a conveying effect in the direction towards the blade head 14 when the blade shaft 12 is rotated.

A bellows, which surrounds the entrainment means 26 and which is mounted on the socket 15 and is held on the latter, prevents impurities from being able to penetrate through the slot 28 into the interior of the socket 15.

The invention claimed is:

1. A method of setting a pre-setting, by which blades of a granulating head carried by a shaft which is driven by a motor and which is displaceable in the axial direction of a granulating device abut against a perforated plate through perforations of which the material to be granulated is supplied wherein use is made of the torque of the motor for this setting, characterized in that the shaft is adjusted at a constant speed in both axial directions in succession, wherein the pattern of the torque of the motor is recorded over the displacement path for both directions and the differential $$\frac{dM}{dx}$$

is formed from this, in which x represents the displacement path of the shaft, the position $x_0$ of the shaft is then determined for $$\frac{dM}{dx} = 0,$$

and finally, starting from the position $x_0$ a position $x = x_0 + x_z$ of the shaft is set, in which $x_z$ represents the desired advance of the shaft in the direction towards the perforated plate.

2. A method according to claim 1, characterized in that the displacement of the shaft is carried out in both axial directions between two positions $x_0$, $x_z$ which corresponds to two pre-set limit values $\delta$, $\epsilon$ for $$\frac{dM}{dx}$$

for which $\delta<0$ and $\epsilon>0$ apply.

3. A method according to claim 1, characterized in that the signal of the torque pattern of the motor is filtered by a low-pass filter before the differential $$\frac{dM}{dx}$$

is formed.

4. A method according to claim 1, characterized in that the measurements are repeated at discrete time intervals t and the setting of the pre-stressing is altered accordingly.

5. A method according to claim 1, wherein the material to be granulated comprises a thermoplastic material.

6. A device for carrying out the method according to claim 1, with a perforated plate against the nozzles of which at least one blade carried by a granulating head of a granulating device is pressed with pre-stressing, the said granulating head being supported inside a granulation housing by a shaft which is displaceable in the granulation housing in the axial direction and which is driven by a motor in rotational movement about its axis, wherein a sensing device, the output signal of which influences an actuating drive for the displacement of the shaft, is provided for the time pattern of the torque (M) of the motor, characterized in that a device for forming the differential $$\frac{dM}{dx}$$

and a device for determining the position $x_0$ of the shaft for $$\frac{dM}{dx} = 0$$

are connected to the actuating drive.

7. A device according to claim 6, characterized in that an input unit is provided for repeating the measurements at pre-determined time intervals.

8. A device according to claim 6, wherein the perforated plate comprises an extruder.

9. A device according to claim 6, characterized in that a device which flattens out the output signal of the sensing device for the time pattern of the torque of the motor is connected to the said sensing device.

10. A device according to claim 9, wherein the device which flattens out the output signal comprises a low-pass filter.

* * * * *